United States Patent [19]
Grau et al.

[11] Patent Number: 5,540,266
[45] Date of Patent: Jul. 30, 1996

[54] DEVICE FOR COUPLING CONTAINERS

[75] Inventors: Gerhard Grau, Muellheim/Baden; Martin Koch, Neuenberg/Baden, both of Germany

[73] Assignee: Buck Werke GmbH & Co., Bad Ueberkingen, Germany

[21] Appl. No.: 355,690

[22] Filed: Dec. 14, 1994

[30] Foreign Application Priority Data

Dec. 16, 1993 [DE] Germany ............. 43 42 962.9

[51] Int. Cl.⁶ ............................................. F16L 37/28
[52] U.S. Cl. ......................... 141/383; 141/346; 141/364; 137/614
[58] Field of Search ............................ 141/383, 384, 141/386, 311 R, 346, 348, 363, 364, 365, 366, 291, 292, 293, 294; 137/614, 614.01, 614.06; 251/149.9

[56] References Cited

U.S. PATENT DOCUMENTS

| | | | |
|---|---|---|---|
| 2,625,410 | 1/1953 | Crowley ........................... | 137/44 |
| 4,274,454 | 6/1981 | Cook ................................ | 141/383 |
| 5,095,946 | 3/1992 | McLennan ...................... | 137/614.01 |
| 5,150,735 | 9/1992 | Bandy et al. ................... | 137/614.06 |
| 5,295,507 | 3/1994 | Bandy et al. ................... | 137/614.06 |

*Primary Examiner*—Henry J. Recla
*Assistant Examiner*—Steven O. Douglas
*Attorney, Agent, or Firm*—Hill, Steadman Simpson

[57] ABSTRACT

A device for coupling two containers comprises connecting branches having essentially circular cross section with each of the connecting branches having a closing member at one end which is essentially circular in cross section for closing the end facing away from the container. When the two connecting branches are brought together, the two closing members are combined into a single member moved by a single actuator so that no clearance is required in each of the branches between the end of the branch and the member. Thus, problems with dirt and atmospheric impurities in a space between the closing member and the end of the connecting member are greatly reduced to prevent contamination of the contents of the container.

14 Claims, 3 Drawing Sheets

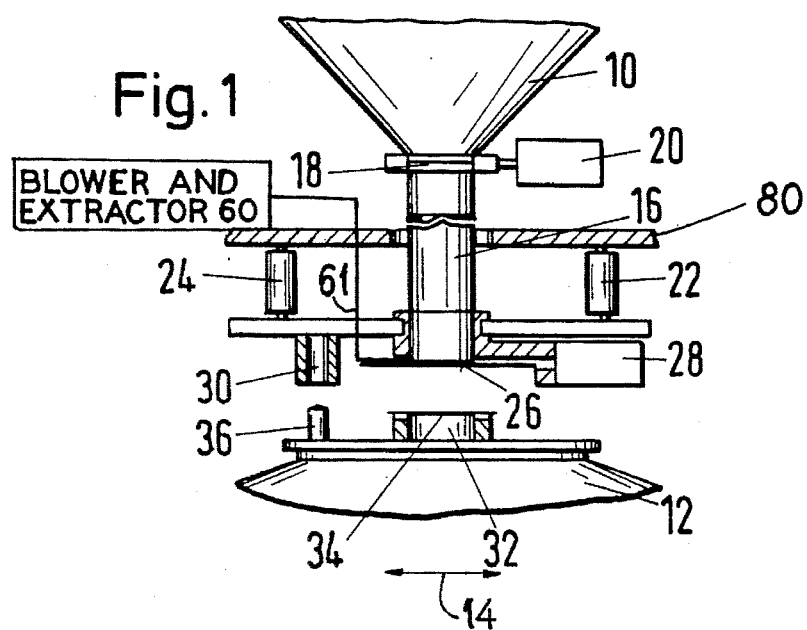
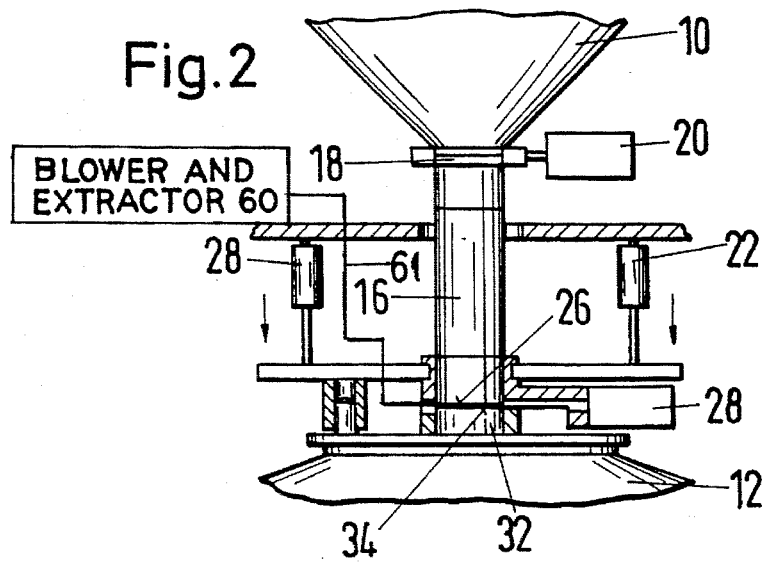
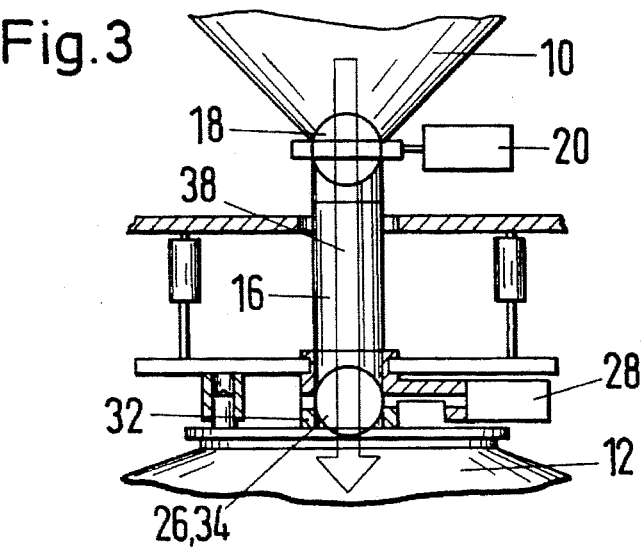

DEVICE FOR COUPLING CONTAINERS

BACKGROUND OF THE INVENTION

The present invention is directed to a device for coupling two containers which respectively have connecting branches or necks having an essentially circular cross section and with each of the branches or necks comprising a closing flap or member having an essentially circular cross section that is close to an end facing away from the container that carries it. The closing flap or member is pivotably by essentially 90° around the diameter of the connecting branch and will have an outside diameter that essentially corresponds to the inside diameter of the connecting branch so that it can be moved with a valve actuator from a closed position wherein it resides essentially transverse relative to the longitudinal middle axis of the branch into an open position wherein it resides essentially parallel to the longitudinal middle axis of the particular connecting branch.

In, for example, chemical or pharmaceutical industries, it is often necessary to couple containers provided with connecting branches or necks to one another in such a way that the free-flowing product present in one of the containers can be transferred into the other container without the product coming into contact with the outside atmosphere. In order to assure that the inside of the containers to be coupled together are only open when the two containers are coupled to one another, closing members or valve members are provided in the connecting branches provided at the respective container. These closing members or valve members are turnable by 90° around a swivel or pivot axis lying essentially diametrically relative to the respective connecting branch with their own respective valve actuators so that the closing members essentially seal the connecting branches, on the one hand, namely in the closed position, but, on the other hand, open the container to the outside when in a position wherein the member lies parallel to the longitudinal middle axis of the respective connecting branch.

It has hitherto been standard to provide closing flaps or members in both connecting branches to be coupled so that their swivel axis is offset relative to the end face of the particular connecting branch so that the necessary space between the end face of the connecting branch and the swivel axis is available in this way for a swivelling or turning of the respective closing members or flaps. In order to protect the end space present between the appertaining closing member and the end face of the appertaining connecting branch in the closed position of the closing member against the penetration of dust and dirt, dust covers are provided at the end faces of the connecting branches. These dust covers must first be removed before the coupling of the containers can, in fact, be accomplished and, therefore, these end spaces are necessarily briefly connected to the atmosphere when coupling the containers.

The previously-known devices of the above-described species have the disadvantage that dust and dirt can still penetrate into the end spaces of the two connecting branches lying in front of the respective closing flaps toward the face end from the outside after the removal of the dust covers. There is also the risk that toxic products that adhere to the walls of the connecting branch in the end space or the closing flaps, as well, will emerge after the end of the product exchange process. In addition, it is also not possible to implement the product transfer without contact with the outside atmosphere, unless a protective atmosphere is provided.

SUMMARY OF THE INVENTION

It is an object of the present invention to improve the device used to accomplish a connection between two containers and, in turn, undone with a simplified coupling event without contact with the outside atmosphere, whereby the risk both of the penetration of outside contamination into the connecting branch as well as the emergence of, for example, toxic products into the outside atmosphere can be prevented.

To accomplish this goal, the present invention is directed to an improvement of a device for coupling two containers, said device has a pair of connecting branches having an essentially circular cross section, each of the connecting branches having a closing member having an essentially circular cross section that is located dose or adjacent to an end of the branch facing away from the container that carries it and is pivotable by essentially 90° around the diameter of the connecting branch. Each of the members has an outside diameter essentially corresponding to the inside diameter of the connecting branch and can be moved with an actuator from a closed position wherein it resides essentially transversely relative to the longitudinal middle axis of the connecting branch into an open position wherein it resides essentially parallel to the longitudinal middle axis of the branch. The improvements are that the closing member has a semiaxle which is mounted in two bearing shells that lie opposite one another and are complimentary with the respective semiaxle and open toward and end face of the appertaining connecting branch, said end face being aligned in closed position with the end face of the other connecting branch and being seated therein with the respective semiaxle essentially shaped in cross section like a semicircular sector whose planar end faces face away from the container that carries the respective connecting branch essentially aligns with the end face of the other coupling member facing away from its container and that are firmly joined to the respective closing members, that only one of the semiaxles can be directly engaged by the valve actuator and that after the end faces of the connecting branches have been pressed against one another in a centered fashion, both closing members engage each other to form a combined member so that the second member is entrained with the first closing member and both members are pivoted in the bearings formed by the two bearing shells between their dosed position and their open position around a full axle formed by the two semi-axles.

Preferably, the actuator is detachably connected to one of the semiaxles.

The invention also proposes that the connecting branch having the semiaxle detachably connected to the valve actuator is attached to a stationary container and the other connecting branch is attached to the movable container.

It is also provided that at least one of the connecting branches is mounted in a floating fashion.

It is also inventively provided that the connecting branches comprise rough centering devices that are complimentary to one another. It is also proposed that the closing members and/or their semiaxles comprise fine centering devices complimentary to one another.

It is also provided that the closing members are each respectively seated in an essentially circular sealing bead having such a cross sectional configuration that, in a condition wherein the allocated closing member is closed and the other connecting piece is not pressed thereagainst, the circular ring-shaped end face of the respective connecting branch is covered by the sealing bead so that it tightly bears on the closing member at the same time the sealing bead has a face sealing surface that faces away from the connecting branch and ascends obliquely radially outward in the direction toward the other connecting branch to be connected thereto. When the two connecting branches are pressed together and seal the joint with the sealing end faces, the region of both sealing beads proximate to the sealing surface are pressed radially outward and relieve the closing flaps for pivoting so that the cylindrical cross section remains and the gap between the closing members is reliably closed.

The invention also provides that the sealing bead covers the edge of the closing member in the separated condition of the two connecting branches.

The invention further proposes that at least one of the two closing members comprises a flexible sealing bead at the outer annular surface so that a sealing of the member halves relative to one another is established after the joining and opening of the closing members.

The invention provides that at least one of the closing members comprises a blower means for charging the joining chambers forming between the closing members pressed against one another with cleaning gas and/or a protective atmosphere.

A further embodiment of the invention is characterized by an extraction chamber surrounding the joining chamber.

It is also inventively provided that at least one of the bearing shells is composed of a glide material or bearing material.

The invention also provides that the closing members can be essentially completely tilted out of the bearing shells around a tilting axis that lies essentially perpendicular relative to the respective semiaxle.

The invention is based on the surprising perception that one succeeds in avoiding the disadvantages of previously-known coupling devices in that both closing members are executed as half-members and are placed directly at the respective connecting branch end. A valve actuator is detachably connected to one of the closing members or, respectively, half-member and the other closing member is capable of being entrained with the engaged member as soon as the two closing members have been pressed against one another.

Both closing members are arranged in their respective sealing bead so that the product-contacting surfaces are covered in the closed position. A seal at the joint of the closing members prevents an emergence of dust and a penetration of product into the gap or joining space between the closing members.

A prerequisite for the functioning of the device of the invention is a strict centering of the two closing half-members relative to one another. A floating bearing of at least one connecting branch preferably serves this purpose. In addition to precentering with standard pin and bore arrangements that are connected to the respective connecting branches, moreover, a fine centering of one closing member directly to the other member occurs in order to keep the influence of the structure tolerances to a minimum in this way.

It can also be advantageously provided in the invention that a blower stream from at least one closing member into the joining space between the two closing members is effected while the connecting branches are being brought together so that, thus, those sides of the closing flaps facing toward the atmosphere can be blown off and cleaned, preferably upon employment of an additional extraction chamber having a connecting extraction system.

The closing members are advantageously shaped so that the above-described blowing can be effectively accomplished. It is especially advantageous, as provided in one embodiment of the invention, that the closing members can be completely pivoted out of the connecting branches for cleaning purposes, since the closing members as well as the bearing shells can then be cleaned while in the standard washing process before changing products.

A contamination-free transfer of product from one container into another is possible under cleanroom conditions in that a tight coupling of the containers without inside dead space in the connecting branches is obtained given the device of the present invention.

Other advantages and features of the invention will be readily apparent from the following description of the preferred embodiments, the drawings and claims.

BRIEF DESCRIPTION OF THE DRAWINGS

FIG. 1 is a diagrammatical cross sectional view of an exemplary embodiment of the present invention with the two connecting branches to be coupled together shown in a first function and separated position;

FIG. 2 is a diagrammatical cross sectional view of the device showing the two branches of FIG. 1 in a connected position;

FIG. 3 is a diagrammatical cross sectional view showing the opening of the various valve members to allow transfer of material between the two containers;

FIG. 4b showing the axles as they are connected together; FIG. 4c showing the axles as they begin rotating to an open position; and FIG. 4d showing the open position;

FIG. 5b being complimentary to FIG. 4b and showing the members engaged with each other; FIG. 5c being similar to FIG. 4c with the members partially rotated to an open position; and FIG. 5d showing the members in the open position;

DESCRIPTION OF THE PREFERRED EMBODIMENTS

Figure 4A:
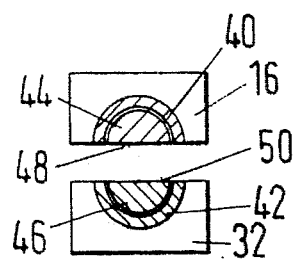
FIGS. 4a–4d are four cross sectional views of the semi-axle for each of the closing members of the connecting branches, with FIG. 4a showing the axles in a spaced apart position.

The principles of the present invention are particularly useful for coupling a stationary container 10 to a transporting container 12 to enable transfer of a product of the container 10 into the container 12. The transport container 12 is movable relative to the stationary container 10 in a direction of the horizontal arrow 14.

At its lower end, the container 10 comprises a connecting branch 16 that is in communication relative to the actual volume of the container 10, which has a stopper valve or means 18 that can be opened and closed by a stopper drive or actuator 20. The connecting branch 16 and container 10 are height-adjustable with pneumatic cylinders 24 and 25 relative to a frame member 80. A first closing flap or member 26 is located at what is the lower end of the connecting branch 16 in FIG. 1, and this first closing flap or member 26, as shall be set forth in greater detail below, can be brought with an actuator 28 from a closed position that closes the end face opening of the connecting branch 16 that lies at the bottom in FIG. 1 into an opened position by pivoting 90° around a swivel or rotation axis that lies in a diameter direction with respect to the connecting branch 16. FIG. 1 also shows the centering bore 30, which is connected to the connecting branch 16.

At an upper side, the container 12, which has been moved under the container 10 in the direction of arrow 14 by a lateral displacement comprises a second connecting branch 32 that is complimentary with the first connecting branch 16 and has a second closing member or flap 34 on its end face facing toward the container 10, which shall be set forth in greater detail later. The member 34 can be brought from the closed position illustrated in FIG. 1 by pivoting through 90° to an opened position in a fashion similar to that of the first closing member 26. A centering pin 36 that is intended for interaction with the centering bore in the arrangement of the container 12. Fine centering devices in the form of at least one additional centering pin and at least one additional centering bore interacting therewith are provided on the closing members 26 and 34 (see FIG. 5a), and these enable the exact mutual centering of the first closing member 26 and the second closing member 34 after the rough centering that is effected by the interaction of the centering pin 36 with the centering bore 30.

When the upper or first connecting branch 16 has been lowered by the action of the pneumatic cylinders 22, 24, as shown in FIG. 2, then the two closing members 26 and 34 will be pressed against one another. In the position illustrated in FIG. 2, both closing flaps or members will reside perpendicularly relative to the longitudinal middle axis of the connecting branches 16, 32 so that a connection between the interior of the container 10 and the interior of the container 12 has not yet been produced.

In the condition illustrated in FIG. 3, the stopper drive or actuator 20 has been actuated to open the valve or stopper means 18, and the actuator 28 has been actuated so that the two closing members 26 and 34, which are now a combined member, have been brought by an actuator 28 into a position that lies parallel to the middle axis of the connecting branches 16 and 32. In the position illustrated in FIG. 3, a product stream illustrated by the arrow 38 can be transferred from the container 10 into the container 12 with an exclusion of the outside atmosphere, wherein the joint between the connecting branches 16 and 32 can be cleaned and, potentially, placed under a protective gas atmosphere before the opening of the closing members 26 and 34 via a blower and extracting device, which is illustrated in FIG. 1 by the box 60 on the frame 80 and connected by a line 61 to a position adjacent the exposed end faces of each of the members 26 and 34. After the end of the transfer of the product stream 38, the actuators 20 and 28 are again actuated, as a result wherein the interior of the container 10 is sealed from the outside in a condition wherein the downwardly directed end face of the connecting branch 16 is closed flush by the first closing member 26. Likewise, the connecting branch 32 of the container 12 is sealed from the outside in this condition by a second closing member 34 that aligns flush with its end face so that the interior volume of both containers including the connecting branches 16 and 32 is protected against external influences after the separation of the containers 10 and 12 without having to put dust covers or the like in place.

Figure 5A:
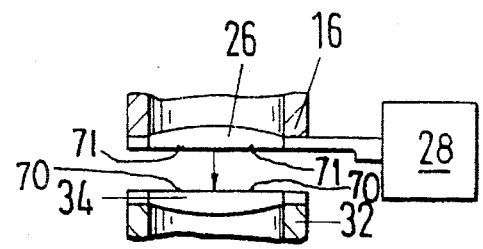
FIGS. 5a–5d are partial enlarged cross sectional views of the two connecting branches, with FIG. 5a showing the valve members in a spaced apart position.
Figure 4B:
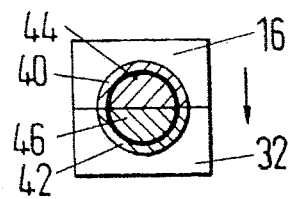
Figure 5B:
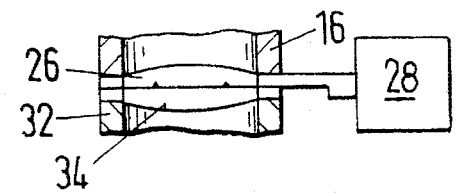

As illustrated in FIGS. 4a–4d and 5a–5d, the various functions and conditions for the two dosing members 26 and 34 and their respective bearings and shafts are illustrated. The first member 26 is supported in the connecting branch by semiaxles 44 at each end received in a first bearing shell that is provided in the first connecting branch 16. The semiaxle 44 has a planar face 48 and a semicircular cross section. In a similar way, the second closing member 34, at each end, has a semiaxle 46 of a semicircular cross section that is received in a pair of bearing shells 42 of the second connecting branch 32. The semiaxles 46 have planar surfaces 50 and, therefore, as shown, have a cross section of a semicircle. The bearing shells 40 and 42 are formed of a glide material or bearing material. As mounted, the planar faces 48 of the first semiaxle 44 and the planar end face 50 of the second semiaxle 46 both lie in the end face of their respective connecting branch and are also aligned with respective end faces of the two closing members 26 and 34, respectively, which end faces face away from the inside of the container. As illustrated in FIG. 5a, the end face of the member 34 has small conical pins 70 that are received in conical recesses 71 in the end face of the member 26 to provide a fine centering of the two members when they are pressed together, as illustrated in FIG. 5b. As illustrated in FIG. 4b, when the two semiaxles 44 and 46 have been united, they form a full axle, which occurs when the branch 16 is moved into contact with the branch 32. Also, the two end faces of the closing members 26 and 34, which have been exactly centered by the pins 70 and the recesses 71, are tightly against one another to form the combined closing or valve member.

Figure 4C:
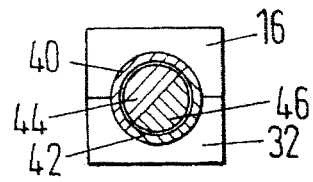
Figure 5C:
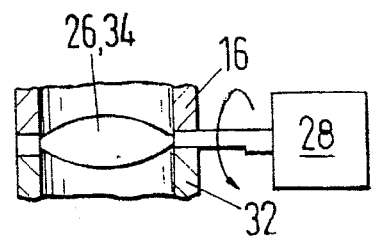
Figure 4D:
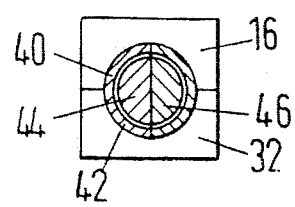
Figure 5D:
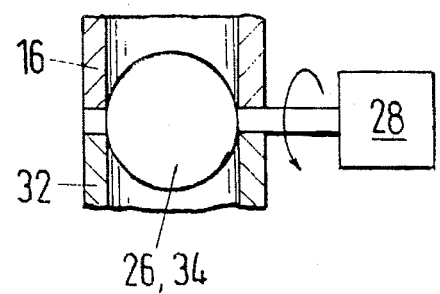

As illustrated in FIGS. 4c and 5c, the actuator 28 will rotate the combined closing or valve member formed by the members 26 and 34 as the combined axle formed by the semiaxles 44 and 46 begins to rotate in the direction of the arrow. In this arrangement, the actuator 28 actually engages the semiaxle 44 while the second member 34 moves by being entrained with the first member 26. As illustrated in FIGS. 4d and 5d, the rotation through 90° has been accomplished and the combined members 26 and 34 are now in the opened position with the members extending along the middle axle of the branches 16 and 32.

Figure 6:
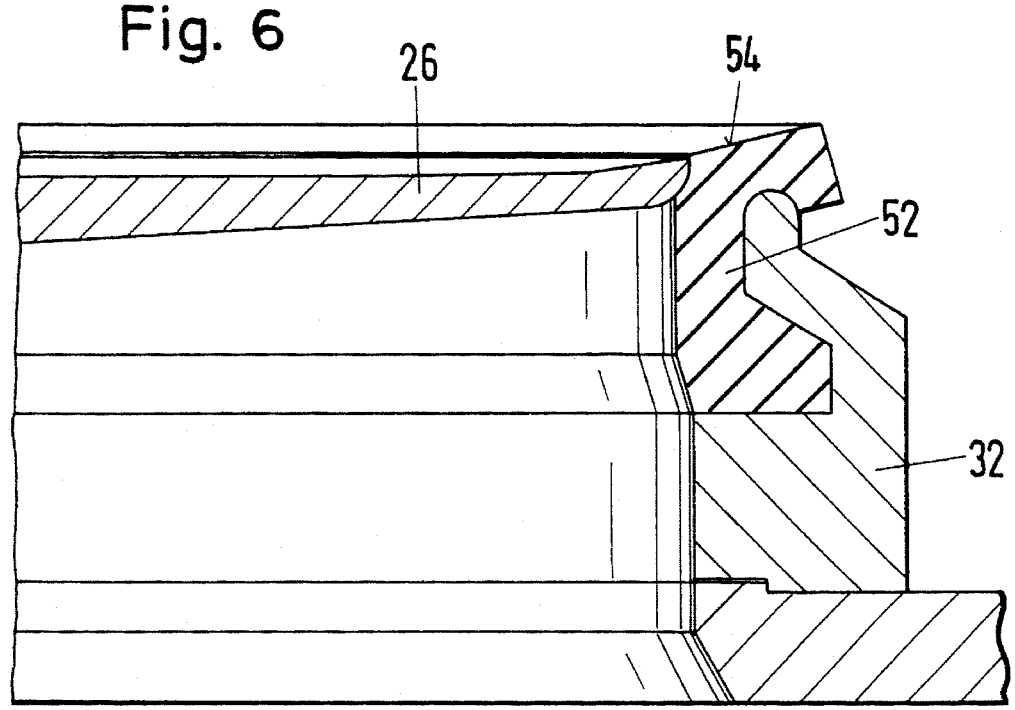
FIG. 6 is a partial cross sectional view of the sealing bead of the connecting branch of the device of FIGS. 1–3 shown in a disconnected or uncoupled position.

In FIG. 6, the closing member 26 of the second connecting branch 32 is sealed with its circumferential edge by a sealing bead 52 when the closing member 26 is not pressing against the first connecting branch 16. The sealing bead 52 comprises an obliquely radially outwardly ascending annular face sealing surface 54. The sealing bead 52 is composed of an overall elastic material.

Figure 7:
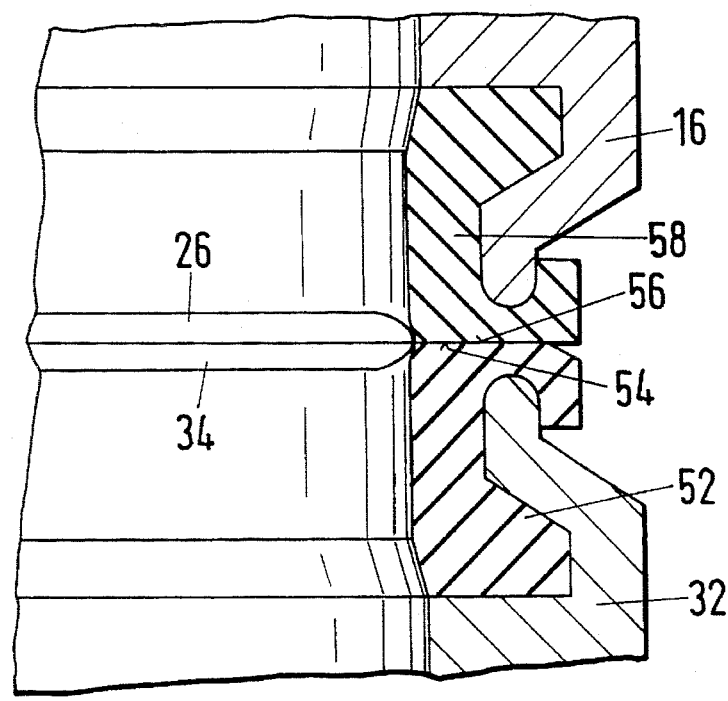
FIG. 7 is a partial cross sectional view showing the sealing connection between the two branch couplings while in the sealed position.

As shown in FIG. 7, when the first connecting branch 16 is pressed against the second branch 32, the face sealing surface 54 of the sealing bead 52 comes into contact with an end face 56 of the other sealing bead 58, wherein the oblique positioning of the face sealing surfaces 54 and 56 have been moved to a horizontal planar position. This movement causes a radial outward flow of the material of the sealing beads 52 and 58, which flow releases the peripheral edge of the combined or fully-closed member formed by the members 26 and 34 so that the combined member is no longer prevented from pivoting by the sealing beads 52 and 56 after the connecting branches have been placed in sealing contact with each other. At the same time, the face sealing surfaces 54 and 56 press tightly against one another and reliably seal the joint between the two connecting branches 16 and 32 from the outside atmosphere.

When the connecting branches 16 and 32 are moved apart, i.e., after the closing members 26 and 34 have been brought back into position shown in FIG. 7, the face sealing surfaces 54 and 56 of the two connected branches are moved inwardly back into position shown by the surface 54 of FIG. 6 and individually create a seal of the respective closing members 26 and 34 relative to their connecting branch 16 or 32 before the outside atmosphere can penetrate into the joint.

Although various minor modifications may be suggested by those versed in the art, it should be understood that we wish to embody within the scope of the patent granted hereon all such modifications as reasonably and properly come within the scope of our contribution to the art.

We claim:

1. In a device for coupling two containers for transfer of contents therebetween, said device including a separate connecting branch having essentially a circular cross section corresponding to each of the containers, each connecting branch having a closing member having an essentially circular cross section being located adjacent to an end face thereof and having an outside diameter essentially corresponding to the inside diameter of the connecting branch, each closing member being rotated through 90° from a closed position wherein the closing member essentially extends transversely relative to the longitudinal center axis of the connecting branch to an opened position where it is essentially parallel to the longitudinal center axis of the connecting branch, the improvements comprising each of the closing members having a semiaxle being seated by, respectively, two bearing shells lying opposite one another and complimentary with respect to the semiaxle that opens toward the end face of the respective connecting branch, said end faces being aligned in a closed position when the end face of each respective connecting branch face each other and are seated against each other with the respective semiaxles, each semiaxle has an essentially semicircular cross section, with planar end faces, that face away from the container including the respective connecting branch, and are essentially aligned with the end faces of each closing member facing away from the container corresponding therewith, only one of said semiaxles being directly engaged by a valve actuator and with the end faces of the connecting branches being pressed against one another in an aligned fashion with the closing members being arranged to form a single combined closing member, the other closing member not directly driven by the valve acuator being entrained to pivot in the bearings formed by the bearing shells and being pivotable between the closed position and opened position with the first closing member connected to the valve actuator and wherein said end faces include means for retaining each closing member within each respective connecting branch when said connecting branches are uncoupled.

2. In a device according to claim 1, wherein the valve actuator is detachably connected to one of the semiaxles.

3. In a device according to claim 1, wherein the connecting branch having the first closing member with the semiaxle detachably connectable to the valve actuator is attached to a stationary container and the other connecting branch is attached to a movable container.

4. In a device according to claim 1, wherein at least one of the connecting branches is mounted for floating movement relative to the outer connecting branch.

5. In a device according to claim 1, wherein the connecting branches comprise first centering devices complimentary to one another.

6. In a device according to claim 5, wherein each of the closing members and the respective semiaxles have complimentary second centering devices associated therewith.

7. In a device according to claim 1, wherein said retaining means comprises each of the closing members being surrounded by an essentially circular sealing bead having a circular cross sectional configuration corresponding to each respective connecting branch so that when each closing member is closed and the other connecting branch is not pressed thereagainst, the sealing bead tightly bears on the periphery of the closing member and has a face sealing surface that faces away from the corresponding connecting branch and ascends obliquely radially outward toward the direction of the other connecting branch, and when the regions of both sealing beads approximate to the sealing surfaces are pressed radially outward so that when the two connecting branches are pressed together, the face sealing surfaces relieve the closing member for rotational movement.

8. In a device according to claim 7, wherein the sealing beads cover the edge of the closing member in a separated condition of the two connecting branches.

9. In a device according to claim 7, wherein at least one of the two closing members comprises a flexible sealing bead at its outer annular surface so that a sealing of the closing members relative to one another is established after the pressing together and opening of the closing members.

10. In a device according to claim 1, wherein at least one of the closing members comprises a blower means for charging the joining chamber formed between the two closing members pressed against one another with gas for providing a protective atmosphere.

11. In a device according to claim 10, which further includes an extractor in fluid communication with the joining chamber.

12. In a device according to claim 1, wherein at least one of the bearing shells is composed of a sliding bearing material.

13. In a device according to claim 1, wherein the closing members can be tilted essentially completely out of the bearing shells around a tilting axis that lies essentially perpendicularly with respect to the respective semiaxles.

14. In a device according to claim 1, wherein the closing members and their semiaxles include coacting centering devices attached thereto.

* * * * *